May 26, 1964 N. GOLD ETAL 3,134,313
SELF-DEVELOPING CAMERA
Filed Dec. 7, 1960 5 Sheets-Sheet 1
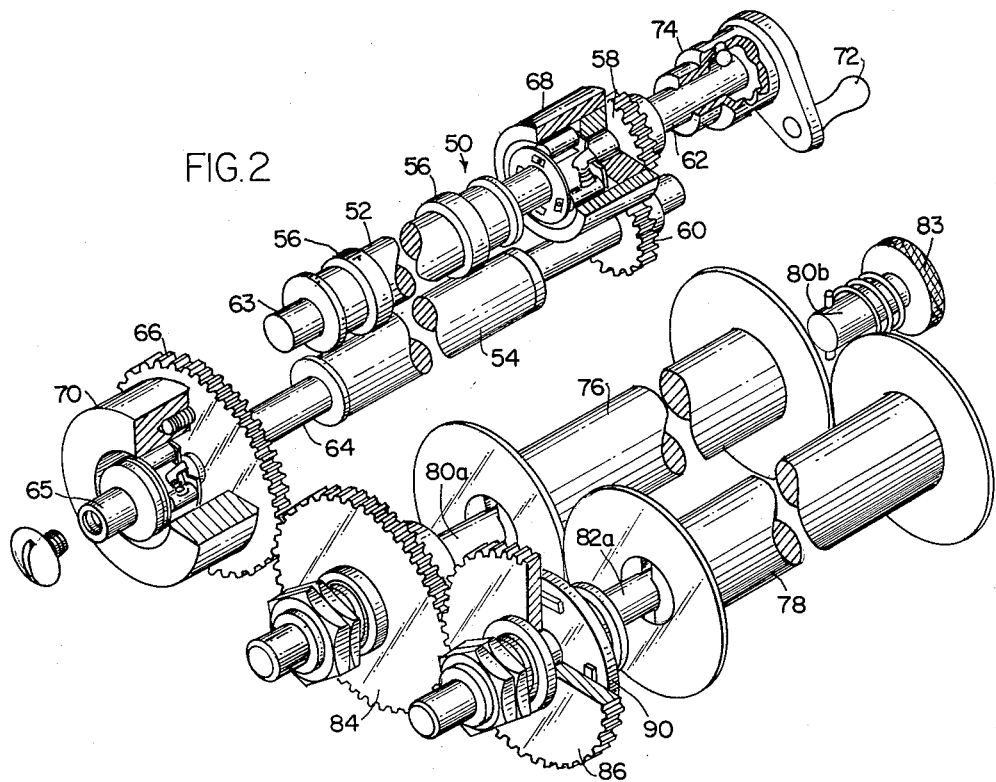
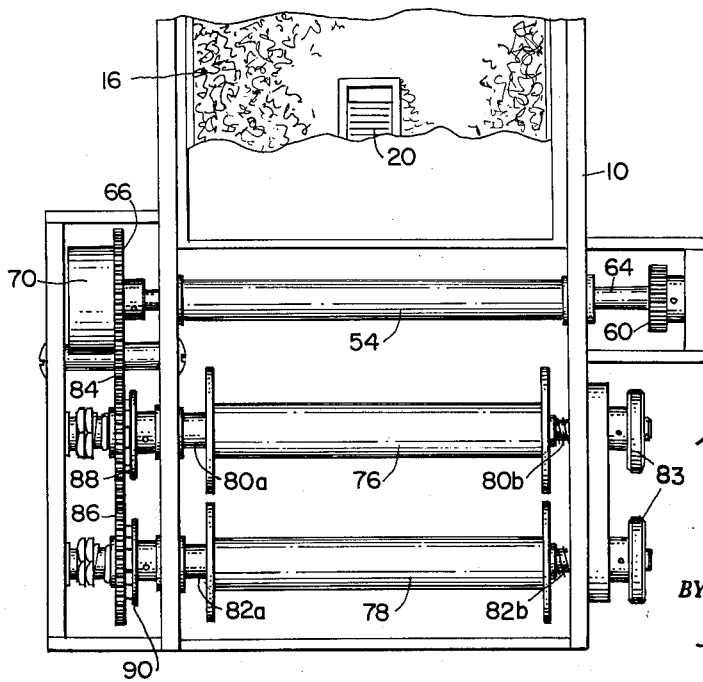
Nicholas Gold
Arthur J. Salle
INVENTORS
BY Brown and Mikulka
Wilfred J. Baranick
Attorneys May 26, 1964  N. GOLD ETAL  3,134,313
SELF-DEVELOPING CAMERA
Filed Dec. 7, 1960  5 Sheets-Sheet 3

Nicholas Gold
Arthur J. Sable
INVENTORS

BY Brown and Mikulka
and Wilfred J. Baranick
Attorneys

May 26, 1964 N. GOLD ETAL 3,134,313
SELF-DEVELOPING CAMERA
Filed Dec. 7, 1960 5 Sheets-Sheet 4

Nicholas Gold
Arthur J. Sable
INVENTORS

May 26, 1964   N. GOLD ETAL   3,134,313
SELF-DEVELOPING CAMERA
Filed Dec. 7, 1960   5 Sheets-Sheet 5
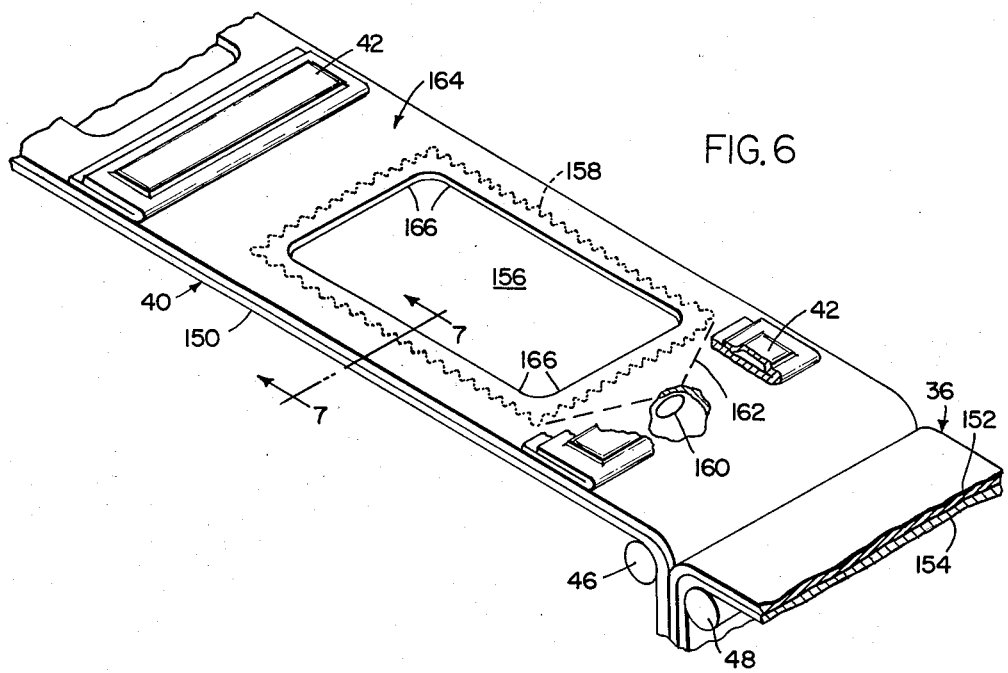
FIG. 6
FIG. 7
FIG. 8
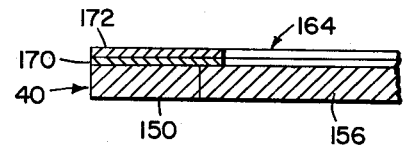
INVENTORS
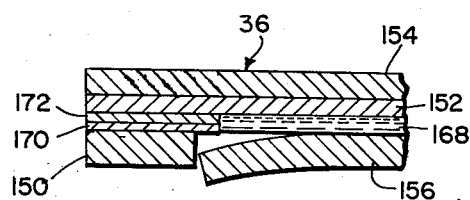
Attorneys

United States Patent Office 3,134,313
Patented May 26, 1964

3,134,313
SELF-DEVELOPING CAMERA
Nicholas Gold, Arlington, and Arthur J. Sable, Boston, Mass., assignors to Polaroid Corporation, Cambridge, Mass., a corporation of Delaware
Filed Dec. 7, 1960, Ser. No. 74,341
11 Claims. (Cl. 95—13)

This invention relates to photography and more particularly to camera apparatus.

An object of the invention is to provide novel camera apparatus for obtaining images by well known diffusion-transfer techniques.

Another object of the invention is to provide a self-developing camera having means adapted to advance a photographic film to exposure position, to advance and compress between compressing members the exposed film and another sheet material with a photographic processing composition therebetween, to advance both materials in superposed relation to an imbibition chamber and to advance or withdraw said materials from the imbibition chamber.

Still another object of the invention is to provide a camera of the above type having therein means serving to separate, to take up and to store said materials.

Still another object of the invention is to provide a camera of the above type wherein there may be produced a recoverable positive print and a recoverable negative from which additional positive prints may be obtained.

A further object of the invention is to provide camera apparatus of the above type adapted to produce identifying photographs on various means of identification such as drivers' licenses, credit cards and the like.

A still further object of the invention is to provide camera apparatus of the above type having an optical system adapted to produce identifying photographs on suitable identification cards and the like.

A still further object of the invention is to provide novel diffusion-transfer processes wherein there may be produced a recoverable positive print and a recoverable negative.

Other objects of this invention will in part be obvious and will in part appear hereinafter.

This invention accordingly comprises the apparatus and products possessing the construction, combination of elements and arrangement of parts and the method possessing the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a plan view of the assembly for advancing photographic materials within the camera and for separating, winding and storing the photographic materials after photoexposure and processing within the camera apparatus;

FIG. 2 is a perspective view illustrating the assembly of FIG. 1;

FIG. 6 is a diagrammatic perspective view of one preferred image-receptive element used in camera apparatus of the above type and illustrates the use thereof in conjunction with photosensitive film;

FIG. 7 is a diagrammatic exaggerated sectional view along the line 7—7 of FIG. 6; and FIG. 8 is a diagrammatic exaggerated sectional view similar to FIG. 7 wherein the operation of removing a portion of image-receptive element bearing a positive image is shown.

Figure 3:
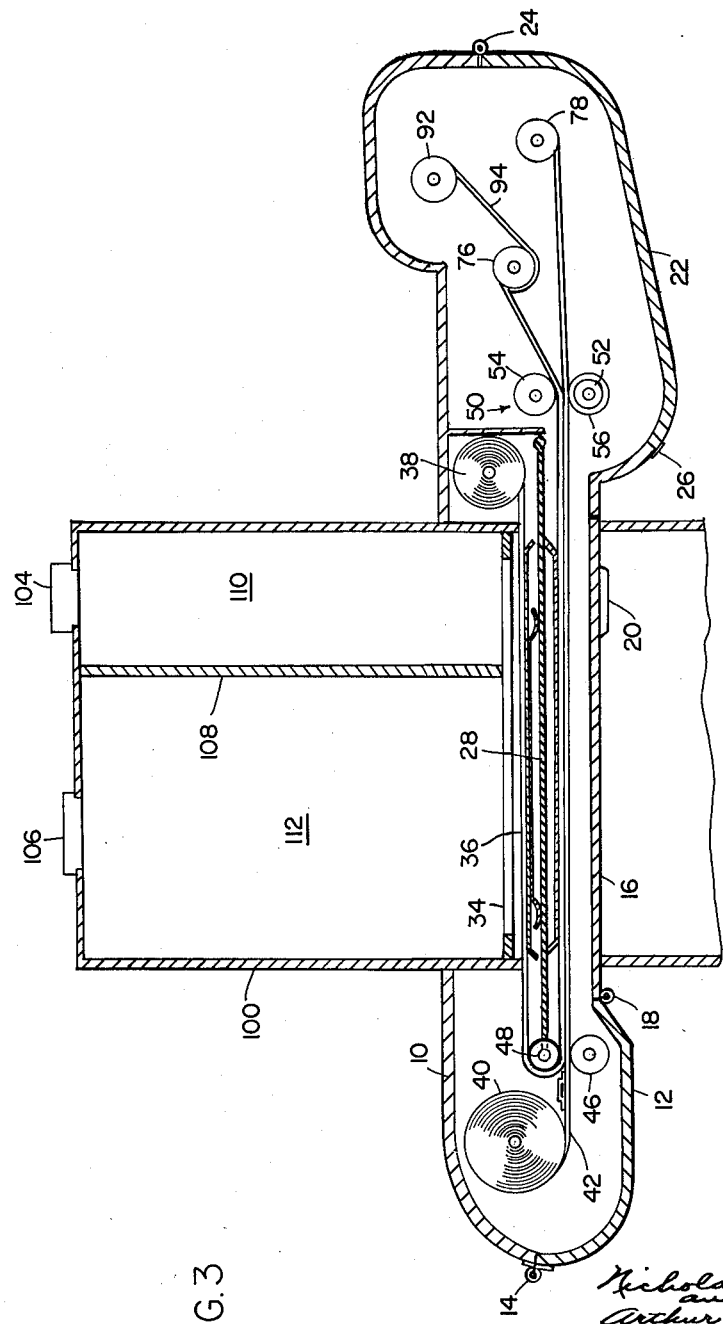
FIG. 3 is a top view of the camera apparatus of FIG. 1 showing photographic materials mounted and threaded therein and including one embodiment of an optical system contemplated by the present invention.

Self-developing cameras of the type sold as Polaroid Land cameras and of a structure such as shown, for example, in U.S. Patents Nos. 2,455,111 and 2,740,340, are adapted to perform a plurality of operations upon materials comprising a roll of photographic film, a roll of another sheet material such as paper material of a width preferably similar to that of the film, and a plurality of collapsible fluid-bearing containers preferably mounted upon a surface of the paper material in a predetermined spaced relation to one another. Each fluid container carries a supply of a film-processing fluid adapted to be released therefrom and spread over an exposed area of film when successive portions of the film and paper material, including portions having the fluid containers positioned therebetween, are subjected to compression during movement of the materials between a pair of compressing elements or members, said movement being achieved, for example, by manually pulling the materials through a slot in the housing of the camera. The materials withdrawn are severed from the materials remaining within the camera. The aforesaid materials and fluid containers are assembled in a predetermined relation to one another as, for example, leaders of the respective materials may be supplied fastened together or subsequently may thus be attached, or they may have an index for establishing their correct relative face-to-face position when mounted in the camera apparatus. Correct relative position of the materials, initially established, automatically brings each fluid container in contact with a portion of the film immediately in advance of an exposed area, during movement of the materials through the camera apparatus.

In carrying out the above-described operations, the camera apparatus is particularly adapted to perform a process whereby there is provided a positive photographic print upon or within one of the materials as, for example, upon the aforementioned image-receptive paper material. In one well-known process, the film comprises a silver halide emulsion as its photosensitive layer and the processing fluid or composition comprises a viscous, aqueous alkaline solution of a silver halide developer and a silver halide solvent. When a photographically exposed film and an image-receptive paper material are positioned closely adjacent to one another and a given quantity of film-processing fluid of the aforesaid type has been spread between and is simultaneously in contact with facing surfaces of both materials, the fluid enables formation on the paper of a positive image of the subject matter of a latent negative image within the exposed photosensitive layer of the film upon completion of the processing period. The resulting positive print is removed from the camera and the materials associated therewith are usually manually withdrawn through an aperture or passage in the housing of the camera apparatus and severed from the materials remaining within the camera apparatus. The processing fluid may include only a solvent for the reactive substances or the paper material may be adapted only to developing or to developing and fixing a latent negative image in the photosensitive layer. It is also possible to accomplish a predetermined processing of other photosensitive materials such as diazonium compounds, bichromates, or ferric salts through such camera apparatus. Color processes such as described, for example, in U.S.

Patents Nos. 2,559,643, 2,698,798 and 2,774,668 and in the copending applications Serial No. 748,421, filed July 14, 1958, now Patent No. 2,983,606, and Serial No. 565,135, filed February 13, 1956, may also be carried out in camera apparatus of the aforesaid structure.

In many instances it is very desirable to carry out rapid continuous processing and to recover not only the positive prints formed but also the negatives produced so that they may be further utilized. As indicated, ordinarily in the well known camera structures heretofore described, the positive print is removed from the back of the camera upon completion of the processing period and the materials associated therewith, which may, for example, include the negative, a picture-defining mask or frame and a remaining portion of image-receptive paper material, are manually withdrawn from the inhibition chamber of the camera through an aperture in the housing of the camera and severed. Thus, manual withdrawal of the materials into environmental light may result in further undesirable exposure of the photosensitive stratum if such is not suitably fixed. Moreover, prolonged contact of the processing fluid on the withdrawn photosensitive stratum may also result in undesirable fogging due to overdevelopment. Manual withdrawal of the materials from the camera into a dark chamber or room also does not favor rapid continuous processing.

In U.S. Patents Nos. 2,443,154 and 2,458,186 there are disclosed self-developing cameras wherein the materials are advanced through the camera by suitable mechanical means and the surplus or waste materials including the negative are wound or rolled up on a spool within the camera by said advancing means. Although this type of structure excludes environmental light from the camera and the rolled negative, which may require further treatment in order to stabilize it, and permits for more rapid continuous processing, the materials wetted with processing fluid often become undesirably adhered so that unwinding of the rolled materials and separation of the materials to achieve negative recovery becomes impossible particularly if the wetted materials have been allowed to dry in the rolled or wound condition. The improved self-developing camera apparatus of the present invention avoids the aforementioned disadvantages present with known camera apparatus. In the camera apparatus of the present invention there is provided within the camera housing mechanical means for advancing the materials through a plurality of predetermined positions within the camera and for actuating means for separating the materials after photoexposure and processing and for taking-up said separated materials. Thus, in the instant camera apparatus, the negative is separated from the remaining materials, such as surplus image-receiving sheet material, and wound up for future recovery and use. In order to insure recovery of the negative in suitable condition for further use in instances where the negative is of a construction or composition which becomes adhered when wetted with processing fluid and taken-up or rolled, there may be provided a non-retentive interleaf strip material adapted to be coiled in superposed relation with the negative so as to prevent sticking or adherence of successive convolutions of the negative due to the processing fluid. The interleaf strip may be formed of any suitable sheet material to which the processing fluid will not firmly adhere in the wet or dry state, nor disturb the latent image. The preferred interleaf strip material is therefore readily strippable or removable from the negative thus facilitating recovery of the negative without damage or other adverse effects. In certain instances the interleaf strip material may carry a coating which reacts with residual processing fluid to aid in preserving the negative, for example by arresting the action of the processing fluid.

As previously indicated there are many instances where it is very desirable to produce a large number of photographs in as short a time as possible. One such instance, for example, resides in the production of identification means such as automobile drivers' licenses, credit cards, employees' identification cards and the like where an identifying photograph of an individual is accompanied by other desired recorded information. In more recent years many States have made it mandatory that any automobile driver's license issued or renewed bear a photograph of the individual as that individual appears as of the time of the issuance or renewal of the license. Thus, it is readily apparent that in such States, yearly hundreds of thousands of individual photographs must be taken and further processed.

Although camera apparatus heretofore employed may be adapted for taking a large number of photographs in a comparatively short time, they are deficient in that no means are provided therewith for quickly verifying that an acceptable photograph of the individual and appropriate information therewith has been taken. Thus in the many instances where unsuitable negatives are obtained, it is necessary to recall a large number of individuals for new photographs. Obviously, this results in considerable inconvenience to the individuals and in increased costs. In the self-developing camera apparatus of the present invention, not only is a recoverable negative quickly obtained, but also a positive print which can be removed from the camera so as to verify at once the acceptability of the negative which will be later recovered to produce additional positive prints, one of which will be issued to the individual as a driver's license and others of which will serve as records in the files of the licensing bureau or law enforcement agency or the like. Thus, it can be seen that in the event of an unsuitable photograph, which is determined almost immediately, the individual is still available for obtaining a suitable photograph with a minimum of inconvenience and cost.

In another embodiment, the self-developing camera apparatus of the present invention is provided with an optical system which permits the simultaneous photoexposure of an individual and an identification or record card so as to produce a composite of the two on the same photosensitive frame of the film. Thus a complete identification card including an individual's photograph and other desired information can be prepared from a single negative.

Referring now to FIGS. 1 through 3, wherein like numbers represent like elements, the camera apparatus includes a casing or housing comprising a frontal portion 10 and a rear portion 12 pivotally mounted with respect to one another at one extremity by hinge 14 and releasably secured at the other end by a latch (not shown). Housing portion 12 comprises a door 16 pivotally secured to said portion 12, as for example, by hinge 18 and a latch 20, the function of said door being that of providing access to sheet materials within the camera after their treatment for removal of each portion bearing a positive photographic image. In order to provide access to the treated sheet materials rolled and stored within the camera housing, and to the sheet-advancing, -separating and -storage means, a second door 22 pivotally attached to a portion of the camera housing by hinge 24 and secured by latch 26 may be provided if desired.

Figure 5:
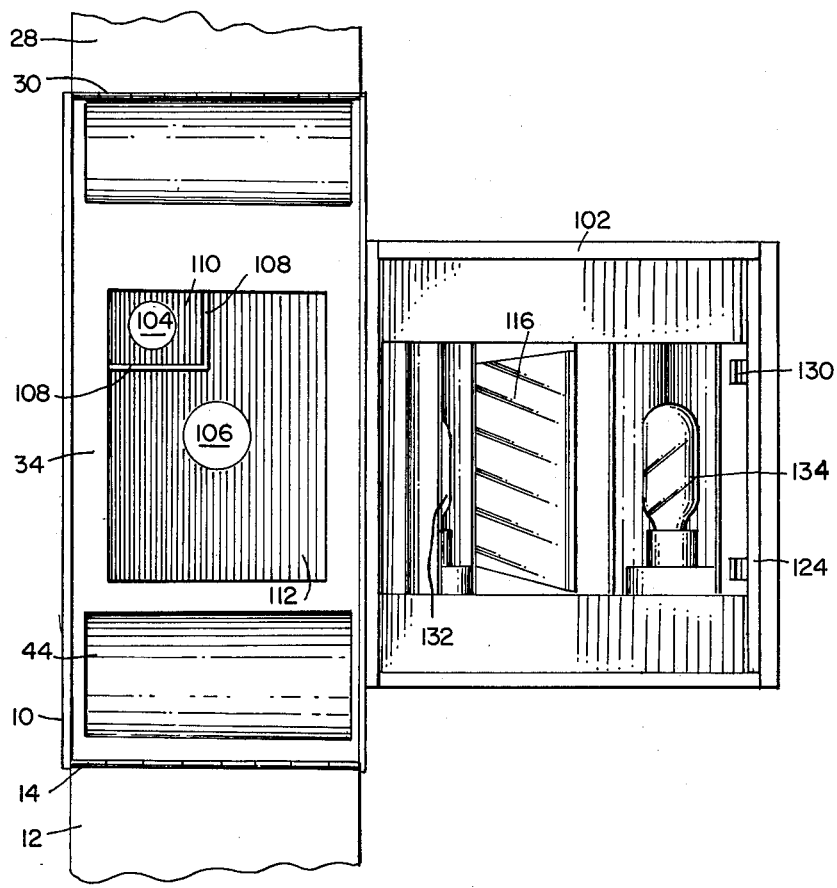
FIG. 5 is a rear view of the camera apparatus in open position showing the frame and lenses through the open back of the camera and other portions of the optical system.

Intermediate pivotal supporting means 28 is held at closed position by housing portion 12 when the latter is closed and latched. Intermediate supporting means 28 preferably comprises a pair of oppositely-facing planar surfaces, one of which is adapted to position and support the film for exposure and the other of which is adapted to position and support areas of said film and another material in a predetermined manner after they have been compressed together. Intermediate supporting means 28 is pivotally attached to frontal housing portion 10 by a hinge 30 (FIG. 5). A framing plate 34 rigidly fastened to frontal housing portion 10 is adapted to cooperate with the intermediate supporting means 28 for positioning and holding an area of film 36 for subjection to photo-exposure.

A photosensitive film element 36 is supplied, in convenient form, from a spool 38 suitably supported or mounted and guided to and from exposure position and positioning in the focal plane by intermediate supporting means 28 and framing plate 34. A roll of another sheet material 40, such as a paper base, image-receptive element having a plurality of collapsible fluid containers 42 mounted in spaced relation upon surface portions thereof which are adapted to be advanced to facing relation with the film 36, is preferably supplied from a cartridge 44 (FIG. 5). Each container releasably holds a quantity of fluid for processing a predetermined exposed area of film element 36. As shown, the image-receptive element 40 is mounted separately from the film element 36. The photosensitive film element of material 36 may comprise a support and a photosensitive stratum. The support may be composed of, for example, cellulose nitrate or cellulose esters such as cellulose acetate, cellulose triacetate, cellulose propionate, cellulose butyrate, cellulose acetate propionate or cellulose acetate butyrate. The photosensitive stratum may comprise, for example, one or more of the silver halides dispersed in a suitable protective material such as gelatin. When the photosensitive stratum comprises a silver halide, the processing fluid confined within rupturable containers 42 comprises a silver halide developer and a silver halide solvent. The sheet material 40 which functions as an image-receptive element may comprise a suitable paper base or support having an image-receptive surface. A more detailed description of image-receptive elements for use in camera apparatus of the type disclosed is set forth hereinafter.

A pair of pressure-applying or compressing members 46 and 48 are suitably mounted adjacent an end of framing plate 34 and of intermediate support means 28 from which an area of exposed film is withdrawn for ready feeding thereto both of film 36 and image-receptive element 40. Film 36 and element 40 are pressed between compressing members 46 and 48 in superposed relation to one another, the exposed surface of the film and the surface of the element 40 which bears the fluid containers 42 being positioned in face-to-face, adjacent relation by said members 46 and 48. After being compressed between said members 46 and 48, the film and element 40 are positioned within a narrow lighttight imbibition chamber formed by housing portion 12 and superposed elements 36 and 40. After a predetermined processing period, door 16 may be opened and a section or portion 156 (FIG. 6) of element 40 bearing a positive image may be removed or detached.

It should be pointed out that more detailed descriptions of the elements of the camera mentioned specifically above are set forth in a number of patents such as, for example, in U.S. Patents Nos. 2,455,111, 2,740,340 and many others. Likewise, it should be noted that although FIG. 3 illustrates one preferred optical system or structure for photographically exposing a light-sensitive film element 36, which structure will be hereinafter described, conventional structures, including for example lens, shutter release, bellows, bellows erecting mechanism and the like, may be employed.

Positioned closely adjacent the point of egress of superposed element 36 and 40 from the lighttight imbibition chamber and along the path of travel of said superposed elements is an advancing and separating means 50 for the elements comprising a pair of mounted feed rollers 52 and 54 having their respective axes preferably lying substantially within a single horizontal plane, the said roller 52 having a pair of spaced members or tires 56 of rubber or other suitable resilient material which contact said roller 54 to provide a positive gripping and propelling action with respect to superposed elements 36 and 40. The ratio of the rollers is necessarily such that roller 54 is of a larger diameter than the tires on roller 56. Mutually engaged spur gears 58 and 60 are attached near one extremity of shafts 62 and 64 respectively. Shaft 64, in turn, is rigidly fixed to roller 54 while shaft 63 is rigidly fixed to roller 52. A drive gear 66 predeterminedly spaced from spur gear 60 is attached near the other extremity of shaft 64 and is adapted to rotate with shaft 64 and transmit rotational force to other elements of the apparatus. To insure rotation of each roller in a given direction only and to hold elements 36 and 40 substantially taut, means such as unidirectional clutch devices 68 and 70 are associated, respectively, with gear 58 and shafts 62 and 63 and gear 66 and shafts 64 and 65. The clutch devices illustrated which permit drive in one direction only with free-wheeling action in the opposite direction may be of well known constructions, the devices shown comprising units including a central cam block, a plurality of hardened and ground rollers, a plurality of springs, and two side retainers, a unit being secured to each of shafts 63 and 65 and the housings for such units being secured to gears 58 and 66 attached to shafts 62 and 64 respectively. Shaft 62 is adapted to extend externally of the camera housing 12 for attachment at the extremity thereof of rotational means such as a handcrank 72, the manual rotation of which imparts rotation to shaft 62 and gear 58 which in turn imparts rotation to shaft 64 and the roller and gears attached thereto.

Roller 54 then drives the superposed elements 36 and 40 while tires 56 on roller 52 follow this motion by rotating until arresting mechanism, such as of the type shown in Patent No. 2,543,159, retards element 40. This, in turn, brakes the rotation of roller 52 through tires 56. This system prevents tensioning the positive element 40 which has been weakened by removal of the separable portion 156 of the positive element, by initially driving element 36 which has more strength and withstands the tensioning. Secured to handcrank 72 is a torque limiting means 74 shown here as being of the ball-detent type to avoid advancing the materials 36 and 40 too far. Means 74 is adapted to slip without harm upon meeting a predetermined torque thus preventing undesirable movement through sheet-arresting and -indexing means of the type shown, for example, in Patent No. 2,543,159, which may result in overadvancement and misalignment of the elements. Instead of handcrank 72, a suitable motor mechanism may be employed for driving advancing means 50.

Releasably mounted in the camera are a pair of storage or take-up spools 76 and 78 spaced from and actuated by advancing means 50. Take-up spool 76 utilized for negative element is releasably carried by shaft members 80a and 80b while take-up spool 78 utilized for the parts of the positive element of assembly not previously detached or removed is releasably carried by shafts 82a and 82b. Shaft members 80b and 82b adapted to extend exteriorly of housing portion 10 are provided with spring-loaded knob means 83 which when pulled outwardly facilitate release of take-up spools 76 and 78. Mutually engaged gears 84 and 86 are attached near one extremity of shafts 80a and 82a respectively, gear 84 in turn mutually engaging drive gear 66. To prevent slippage of elements 36 and 40 as they are being separately wound on take-up spools 76 and 78 respectively, slip clutch devices 88 and 90 are mounted respectively with shaft 80a and gear 84 and shaft 82a and gear 86. Slip clutch 90 shown through the cutaway portion of gear 86 may be of any well known construction such as that shown which comprises a plate member carrying a plurality of frictional pads, e.g., cork, in contact with the inner face or surface of gears 84 and 86. As can be seen, actuation of advancing means 50 by manual rotation of handcrank 72 also imparts rotation to take-up spools 76 and 78.

In operation, the superposed and compressed elements are passed between and frictionally engaged by roller 54 and tire members 56, and extremities of the negative and surplus or remains of the positive assembly are threaded respectively in the slots of take-up spools 76 and 78. It is apparent that clockwise rotation of the handcrank 72 causes rotation of the mutually engaged spur gears 58 and 60, shaft 64 and roller 54. Roller 54 causes rotation of shaft 63 and roller 52 through tires 56, the rotation of rollers 52 and 54 being in opposite directions relative to each other in such a manner as to propel the superposed elements inserted between and gripped by roller 54 and tire members 56. Rotation of gear 60 and shaft 64 attached thereto further causes rotation of gear 66 which, in turn, drives or actuates the gear train comprising overdriven gears 84 and 86 so as to rotate take-up spools 76 and 78. As the superposed elements are propelled through advancing means 50, they become separated and then wound.

When the wetted negative element to be wound on take-up spool 76 is of a construction or composition which may become adhered together, there may be provided, as shown in FIG. 3, a spool 92 supported for free rotation but suitably braked to limit unspooling thereof carrying a supply of an interleaf strip material 94 which does not adhere to the processing fluid or negative and which can be readily stripped therefrom. Preferred materials for interleaving with conventional film elements comprise polyesters, for example, a polyalkylene terephthalate such as polyethylene terephthalate sold under the Du Pont trade name of "Mylar." As indicated, a suitable interleaf strip material need not be employed if the film is of a construction or composition which will not adversely adhere together when wetted with processing fluid and then wound. For example, the support of the film element may comprise polyethylene terephthalate or the outer surface of the support may be coated with polyethylene terephthalate so that, upon winding, the surfaces in contact with one another do not become firmly adhered together. When conventional film elements and processing fluids or compositions are employed, fogging of the processed film element by continued contact of the processing fluid therewith may be prevented by providing on the surface of the interleaf strip material positioned in face-to-face adjacent relation with the wetted photosensitive stratum a coating which, for example, reacts with residual processing fluid to arrest the action thereof. The coating may, for instance, include a suitable acidic material for lowering the pH of the processing fluid so as to terminate the developing action.

For facility in loading or threading the elements through the camera apparatus, shafts 62 and 63 and the elements attached to and carried thereby are suitably mounted in housing portion 12 while shafts 64 and 65 and the elements carried thereby, the take-up spool assemblies and the interleaf supply assembly, if employed, are mounted in housing portion 10.

Figure 4:
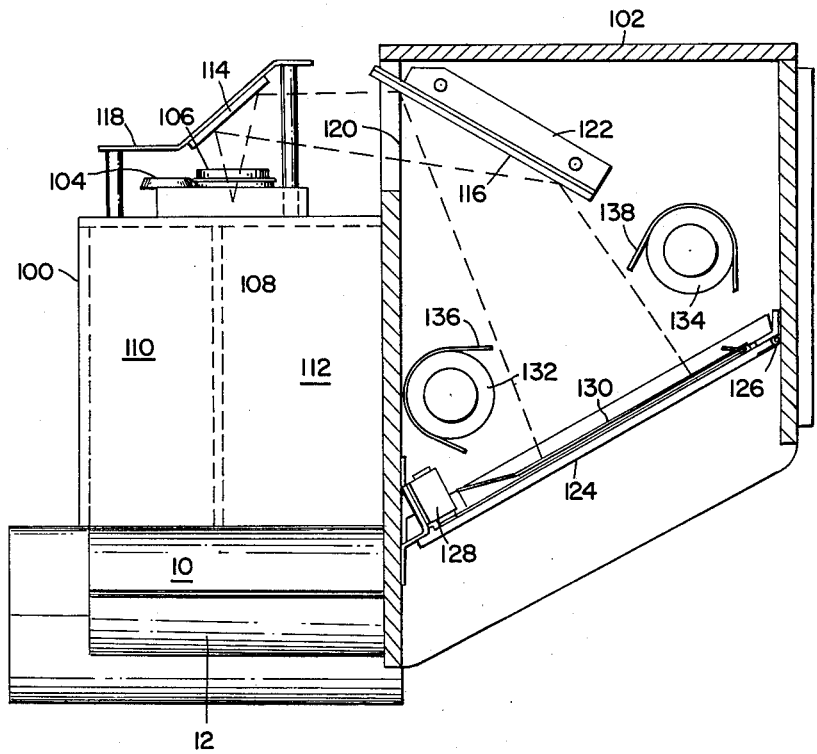
FIG. 4 is a sectional view of the optical system referred to in FIG. 3.

Referring now to FIGS. 3, 4 and 5, there is one specific optical arrangement or system for use in the preparation of identification cards which may be employed with the camera apparatus described above. For simplicity, such elements as shutter release means, means for varying focus, shutter speed, and the like are not shown in the drawings. The split-image optical system comprises an upper casing portion 100 secured to frontal housing portion 10 of the camera and a lower casing portion 102. The upper casing portion 100 is secured to housing portion 10 so as to form a lighttight enclosure around framing means 34. A pair of lenses 104 and 106 in predetermined spaced relation are provided in the frontal section of upper casing 100. The exposure chamber provided by upper casing 100 is divided by suitable partitions or baffles 108 into two enclosed lighttight compartments 110 and 112 such that light rays passing through lens 104 are prevented from reaching that portion of the photosensitive surface or area to which lens 106 transmits an image. It should be understood that the location or position of chamber 110 with respect to framing means 34 need not be as shown, the particular location thereof obviously being dependent upon the location on the identification card of the area or space where an individual's photograph is to appear. Each compartment has a lens for viewing different objects and provides an optical path between said lens and the area of the film element 36 held in the focal plane of said lens. As shown, photoexposure of an individual is accomplished through lens 104 while simultaneous photoexposure of an identification record card is achieved through lens 106 to form a composite image of the two on a single frame or area of film 36. Shutter means and synchronized shutter release means (not shown) are employed for achieving the simultaneous photoexposure. Viewing of the identification record card is achieved by reflecting means such as by a pair of inclined mirrors 114 and 116. Mirror 114 carried in an inclined position by suitable support means 118 secured to casing 100 is positioned in the field of view of lens 106 with the reflecting surface plane thereof directed generally downward. In the upper portion of casing 102 which extends beyond the frontal portion of casing 100, there is provided an opening 120 which permits an unobstructed view between inclined mirrors 114 and 116. Inclined mirror 116 is supported by suitable means 122 within casing 102 directly below inclined mirror 114, the reflecting surface plane thereof directed generally upward so that said surface reflects light rays from the identification card through said opening 120 and upon the reflecting surface of inclined mirror 114.

The rear portion of casing 102 is provided with a door 124 pivotally mounted at the lower end by hinge 126 and releasably secured at the upper end by latch means 128 such as magnetic latching means. The inner planar surface of door 124 is provided with identification card holder or support means 130 such as predeterminedly spaced clip means as shown. In the closed position, the door and means 130 hold the identification card to be photographed in a suitably inclined position so that light therefrom falls upon mirror 116. Full illumination of the identification card held by means 130 is provided by one or more suitably arranged incandescent lamps, two lamps 132 and 134 having suitable shields or reflecting means 136 and 138, respectively, being shown here. If desired, the lamps may be so electrically connected that upon closure of door 124, they are activated.

The above-described camera apparatus may be carried by a suitable support or tripod structure (not shown) which readily permits vertical adjustment of the camera, i.e., raising or lowering the camera so that individuals of different heights may be photographed. Ready determination in any particular instance of the proper height of the camera and desired view of the individual to be photographed may be achieved by providing upon the camera and in predetermined relationship with lens 104, means for projecting a very small beam of light upon the individual and adjusting the camera position until the light beam falls upon a predetermined portion of the individual such as his nose. In other words, the projection means is fixedly aligned and adjusted with respect to lens 104 so that when a beam of light emitted therefrom falls upon a predetermined portion of the individual to be photographed it is immediately known that the camera apparatus is at the proper height for photographing the desired view of the individual.

Referring now to FIGS. 6, 7 and 8, wherein there is illustrated one preferred image-receptive element suitable for use in camera apparatus of the types described hereinbore, FIG. 6 diagrammatically illustrates an image-receptive element 40 comprising a flexible image-receiving sheet or layer 150 ready for processing in conjunction with an exposed photosensitive film element 36 which comprises a photosensitive stratum or layer 152 carried on a suitable base or support 154. A picture frame portion of the film element 36 is assumed to have been posed in camera apparatus as hereinbefore described, and FIG.

6 includes a pair of pressure rollers 46 and 48 used in such camera apparatus for processing elements 36 and 40.

Elements 36 and 40, as shown, are in roll form and have a plurality of picture frame portions extending successively and substantially from end to end thereof. In the image-receiving sheet 150, each picture frame portion has a removable print section or portion 156 lying within the confines thereof and defined by perforations 158 which extend through the sheet and which permit each removable print section to be removed from the image-receiving sheet.

To facilitate removal of each print section 156, the image-receiving sheet 150 is provided with a tear-out or thumb aperture or hole 160 located adjacent the leading edge of the removable print section, i.e., the transverse edge of a print section which first passes between the rolls 46 and 48 during processing. In the embodiment illustrated in FIG. 6, perforations 158 are in the shape of curved lines adapted to provide a deckle and are arranged to enclose a substantially rectangularly shaped area. Adjacent the leading transverse edge of the deckled portion, perforations 162 are formed in the sheet 150 and extend from each corner of the deckle towards the tear-out hole 160. The thumb hole 160 and perforations 162 are arranged and designed to assist removal of their associated print section 156.

Each removable print section 156 is adapted to have a picture area which lies inside the margins or boundaries thereof as defined by the perforations 158 and within which the transfer image is adapted to be confined. To provide this picture area, a framing means in the form of a mask or frame 164 of flexible sheet material, which has a length substantially equal to the image-receiving sheet 150 and which is provided with an aperture for each removable print section 156 of sheet 150, is superposed on the front or image-receiving surface of sheet 150 with each aperture in registered relation to a print section 156 and is secured to sheet 150. Apertures in the mask 164, the edges of one of which are indicated in FIG. 6 by reference numeral 166, are equal in number to the picture frame portions provided on the image-receiving sheet 150 and extend lengthwise of the mask 164 in a predetermined spaced relation. These apertures each have dimensions substantially equal to a picture area for the transfer image and consequently the edges 166 thereof will be within the boundaries 158 of each removable print section. Mask 164 may have an overall width substantially equal to or slightly less than the width of the image-receiving sheet 150.

A rupturable container 42, adapted to releasably hold a viscous liquid processing fluid or composition 168, shown spread as a uniform, thin layer in FIG. 8, is preferably associated with each picture frame portion of the image-receiving sheet 150, and containers of this character are shown mounted in the outer surface of the mask 164 to extend transversely of sheet 150 and mask 164 adjacent the leading edge of each picture frame portion thereof. These containers are made of flexible, substantially liquid-impermeable sheet material which is folded over upon itself and sealed at its ends and along the adjacent long edges thereof which are brought together by folding. Complete sealing of the containers takes place after they are filled. Containers 42 are secured in the mounted position by suitable means. The long edge seal of each container forms the trailing edge and is designed so that when the image-receiving sheet 150 is pulled through rollers 46 and 48, hydraulic pressure will rupture the container at this long seal to cause its contents to be discharged therefrom for spreading over the surface of the image-receiving sheet 150.

The image-receiving sheet 150 may comprise any suitable image-receptive material. It may comprise a single layer or sheet as shown or it may comprise a suitable base or support material carrying thereon a coating or layer of an image-receptive material. The image-receiving sheet 150 may also contain various photographic agents or reagents, such as for example, one of the vigorous silver precipitating environments described in U.S. Patent Nos. 2,698,237 and 2,698,245. A wide choice of materials is available from the fields of organic plastics, papers, reversible film-forming colloids, proteins such as gelatin albumen and the like, and carbohydrates such as starch and the like, as well as mixtures of such materials where they are compatible for forming the image-receiving sheet. One preferred material for the image-receiving sheet comprises baryta paper.

With regard to the mask 164, it may comprise any suitable material or materials which possess, whether wet or dry, sufficient strength alone or in conjunction with the image-receiving sheet 150 so as to permit advancement of the tensioned elements within the camera apparatus, particularly after detachment or removal of print section 156, without undesirable severance of, for example, portions of the image-receiving sheet 150 and mask 164 adjacent the mask aperture. Tearing or breaking of the mask or image-receiving sheet, particularly at the corners of the aperture or picture cutout provided by the mask, may be further prevented or guarded against by having the corners rounded instead of square. Moreover, the mask or the surface thereof which is adjacent the film element 36 during processing must be of a composition which does not adversely adhere to the processing composition or the processed film element or negative which is to be recovered so that clean separation of the processed film element or negative from the image-receiving element or positive assemblage is readily achieved. Preferably the mask or the surface of the image-receiving sheet adapted to receive a transfer image comprises a composition which firmly bonds the mask to at least marginal edge portions of said image-receiving surface so that said mask and said portions of the image-receiving sheet remain substantially adhered together at all times.

The mask 164 may comprise a single material which possesses the desired characteristics or it may comprise a plurality of materials. In one embodiment, the mask comprises relatively thin organic polymeric material which is resistant to tear and which is not deleteriously adhered by the processing fluid to the film element, such as, for example, a polyester, e.g., a polyethylene terephthalate. Such organic polymeric material may also be of a composition, for example, a heat-sealing thermoplastic, which forms a direct, strong, moisture-impermeable or -impenetrable bond with the image-receiving sheet. Likewise, the mask may comprise a single sheet of organic polymeric material which is tear resistant and non-adherent to processing fluid and the image-receiving sheet, at least the marginal edge portions thereof, may comprise, for example, a heat-sealing thermoplastic which forms with the mask a strong, moisture impenetrable bond. The desired mask characteristics may also be obtained by employing a plurality of suitable organic polymeric materials. For example, in the embodiment illustrated in FIGS. 7 and 8, the mask is a laminate comprising a first organic polymeric material 170 which possesses a strong bonding or sealing capacity to the surface of the image-receiving sheet 150 and a second organic polymeric material 172 which is tear resistant and which does not adversely adhere to the processing fluid 168 or the processed film element 36. One preferred mask construction of the above type comprises a laminate wherein said first organic polymeric material comprises a thermoplastic, heat-sealing, moisture-resistant material such as polyethylene and said second organic polymeric material comprises a polyester such as polyethylene terephthalate with the heat sealable polymeric material comprising the least amount of the laminate. The thickness of the mask may be varied considerably since it is dependent in large part upon the space or gap desired between superposed surfaces of the image-receptive element and the film element.

Operation of the preferred apparatus employing an image-receptive element as described above is as follows. Leaders of film 36 and image-receptive element 40 are threaded through the apparatus as shown and attached to take-up spools 76 and 78 respectively. In the event that film 36 is of a construction or composition such that successive convolutions thereof due to the processing fluid adhere or stick together on take-up spool 76, interleaf strip material 94 which is adapted to be coiled in superposed relation with film 36 and which is also readily strippable from film 36 may be supplied from supply roll 92 which is freely rotatable but suitably braked to limit unspooling thereof. As shown, the interleaf strip material is superposed and wound with the film 36 as take-up spool 76 rotates.

The film 36 is advanced by clockwise rotation of handcrank 72 until the first exposable area thereof is positioned across framing plate 34. An identification or information record card, e.g., automobile driver's license, having a blank space or area in the lower left-hand corner thereof for an individual's photograph is properly inserted in holding means 130 and the door 124 closed. Lamps 132 and 134 are lit so as to fully illuminate the identification card to be photographed. The light rays from the card fall upon inclined mirror 116 which, in turn, reflects and transmits them through opening 120 to inclined mirror 114 which then reflects the light rays so as to pass them through lens 106. Light rays from the individual being photographed pass through lens 104. Simultaneous photoexposure produces a composite image of the identification card and individual upon the single area of film 36 positioned across the framing plate 34. As handcrank 72 is rotated, the film 36 and image-receptive element 40 are advanced and a fluid container properly positioned therebetween is compressed between members 46 and 48, thus releasing processing fluid between facing surfaces of film 36 and element 40. The superposed and compressed elements are advanced to the imbibition chamber for a predetermined processing period, e.g., for completing formation of a positive print on element 40, after which time door 16 may be opened and portion 156 of element 40 bearing said positive image may be stripped from film 36 and removed from the camera to verify whether a satisfactory composite negative of the identification card and subject has been achieved. Concurrently with the advancement of exposed film 36 from the exposure position and into processing arrangement with element 40, an unexposed portion of film 36 is positioned across framing plate 34. Also concurrently with the advancement of elements 36 and 40, rotation of take-up spools 76 and 78 takes place so that leading portions of the elements or previously processed portions of the elements are propelled by advancing means 50 from the processing or imbibition chamber and separated as they are wound on spools 76 and 78; the negative element being wound and stored on spool 76 with an interleaf material if necessary, and the remnants of the positive element assembly including, for example, surplus marginal portions of image-receptive material and masking means being wound and stored together on spool 78. Upon exhaustion of the elements within the camera, the spools 76 and 78 are removed.

The negative, which comprises a plurality of successive frame portions are areas of composite images wound on spool 76, may then be unwound and utilized to provide additional positive prints which serve as drivers' licenses and as file record copies.

Since certain changes may be made in the above apparatus, products and method without departing from the scope of the invention herein involved, it is intended that all matter contained in the preceding description or shown in the accompanying drawings shall be interpreted as illustrative and not in a limiting sense.

What is claimed is:

1. Camera apparatus for photographically exposing a photosensitive film element and for subjecting said film element to a predetermined process comprising, in combination, means for mounting a roll of said film element, means for separately mounting a roll of image-receptive element carrying a plurality of collapsible fluid containers in spaced relation along a surface thereof, each container releasably holding a quantity of fluid for processing at least one exposed area of said film element, means for photographically exposing said film element, means comprising a pair of compressing members between which said elements are advanced in superposed relation, said compressing members acting in cooperation with said elements to spread the contents of each container to a predetermined area of said film element, means providing a lighttight chamber for receiving said elements after said elements are compressed and the contents of a container are spread therebetween, means associated with said chamber providing access thereto for removal of a portion of said image-receptive element, said photosensitive element and the residual of said image-receptive element remaining in superposition for an indefinite period until subsequent advancement of said elements, advancing means spaced from said member along the path of travel of said superposed elements comprising a pair of feed rolls adapted to frictionally engage said superposed elements for advancing said elements within said camera apparatus, said advancing means being provided with unidirectional clutch means for maintaining said elements taut during advancement, means located externally of said camera apparatus for actuating said advancing means, and storage means spaced from said advancing means and actuated thereby comprising a pair of releasably mounted take-up spools upon one of which said film element is adapted to be wound and upon the other of which such parts of said image-receptive element not previously detached are adapted to be wound.

2. The camera apparatus of claim 1 wherein said advancing means is provided with torque limiting means.

3. Identification camera apparatus for photographically exposing a photosensitive film element and for subjecting said film element to a predetermined processing comprising, in combination, means for mounting a roll of said film element, means for separately mounting a roll of an image-respective element, said film element and said image-receptive element having a plurality of image exposure areas, a pair of objective lens systems which simultaneously provide two separate images on each exposure area, one of said images being that of a person and the other of said images being that of a suitable sheet bearing printed or written matter thereon which when taken with the associated image of the person provides identifying data of the said person, shutter means associated with each of said lens systems, means for simultaneously operating said shutter means, means comprising a pair of compressing members between which said elements are advanced in superposed relation, said elements having a processing fluid spread therebetween as the same are advanced between said compressing members, said compressing members acting in cooperation with said elements to spread the contents of said container to an exposed area of said film element, means providing a lighttight chamber for receiving said elements after said elements are compressed and the fluid spread therebetween, means associated with said lighttight chamber providing access thereto for removal of a portion of said image-receptive element, said photosensitive element and the residual portion of said image-receptive element remaining in superposition for an indefinite period of time until subsequent advancement, advancing means spaced from said lighttight chamber along the path of travel of said superposed elements for engaging said elements to predeterminedly advance the same within the said camera apparatus, said advancing means comprising a pair of juxtaposed roller members, one of said members being rotated by an external device, the other of said members having a pair or more of spaced resilient rings mounted on the circumference thereof, said rings braking rotation of said roller member when rotation of said other roller member is ceased, and storage means spaced from said advancing means and actuated thereby comprising a pair of releasably mounted take-up spools upon one of which said film element is adapted to be wound and upon the other of which such portions of said image-receptive element not previously detached are adapted to be wound.

4. The camera apparatus of claim 3 wherein said advancing means comprises a pair of feed rollers adapted to frictionally engage said superposed elements.

5. The camera apparatus of claim 3 wherein there is provided means for supplying an interleaf material to the take-up spool upon which said film element is adapted to be wound.

6. The camera apparatus of claim 5 wherein said supply means comprises a releasably mounted free rotating spool for holding a quantity of interleaf material, said spool being predeterminedly spaced from said take-up spool upon which said film element is adapted to be wound.

7. Camera apparatus for photographically exposing a photosensitive film element and for subjecting said film element to a predetermined processing comprising, in combination, means for mounting a roll of said film element, means for separately mounting a roll of an image-receptive element, exposure chamber means for exposing said film element comprising at least two compartments, each of said compartments having a lens for viewing different objects and providing an optical path between said lens and the area of said film element held in the focal plane of said lens, shutter means associated with said lenses, means for simultaneously operating said shutter means, means for reflecting light from a record card through one of said lenses, another of said lenses adapted to view an individual to be photographed, means comprising a pair of compressing members between which said elements are advanced in superposed relation, said elements having a fluid container positioned therebetween as the same are advanced between said compressing members, said compressing members acting in cooperation with said elements to spread the contents of said container to an exposed area of said film element, means providing a lighttight chamber for receiving said elements after said elements are compressed and the contents of said container spread therebetween, means associated with said lighttight chamber providing access thereto for removal of a portion of said image-receptive element, advancing means spaced from said lighttight chamber along the path of travel of said superposed elements for engaging said elements to predeterminedly advance the same within the camera, said advancing means being provided with unidirectional clutch means for maintaining said elements taut during advancement, and storage means spaced from said advancing means and actuated thereby comprising a pair of releasably mounted take-up spools upon one of which said film element is adapted to be wound and upon the other of which such parts of said image-receptive element not previously detached are adapted to be wound.

8. The camera apparatus of claim 7 wherein said advancing means is provided with torque limiting means.

9. Camera apparatus for photographically exposing a photosensitive film element and for subjecting said film element to a predetermined processing comprising, in combination, means for mounting said film element and an image-receptive element, means for photographically exposing said film element, means comprising a pair of compressing members between which said elements are advanced in superposed relation, means for introducing a processing composition between said elements as the same are advanced between said compressing members, said compressing members acting in cooperation with said elements to spread said processing composition to a predetermined area of said film element, said image-receptive element having a detachable image-receiving portion thereon, means providing a lighttight chamber for receiving said elements after said elements are compressed and the said processing composition is spread therebetween, means associated with said chamber providing access thereto for removal of said detachable portion of said image-receptive element, said photosensitive element and the residual portion of said image-receptive element being in superposition for an indefinite period of time until subsequent advancement of said elements, advancing means spaced from said compressing members along the path of travel of said superposed elements for engaging said elements to predeterminedly advance the same within the camera apparatus, storage means spaced from said advancing means comprising a pair of take-up members upon one of which said film element is adapted to be held and upon the other of which the residual portion of said image-receptive element is adapted to be held, and means for supplying an interleaf material to the take-up member upon which said film element is adapted to be held.

10. Camera apparatus for photographically exposing a photosensitive film element and for subjecting said film element to a predetermined processing comprising, in combination, means for mounting a roll of said film element, means for separately mounting a roll of an image-receptive element carrying a plurality of collapsible fluid containers in spaced relation along a surface thereof, each container releasably holding a quantity of fluid for processing at least one exposed area of said film element, means for photographically exposing said film element, means comprising a pair of compressing members between which said elements are advanced in superposed relation, said compressing members acting in cooperation with said elements to spread the contents of each container to a predetermined area of said film element, means providing a lighttight chamber for receiving said elements after said elements are compressed and the contents of a container are spread therebetween, means associated with said chamber providing access thereto for removal of a portion of said image-receptive element, said film element and the residual of said image-receptive element remaining in superposition for an indefinite period until subsequent advancement of said elements, advancing means spaced from said chamber along the path of travel of said superposed elements comprising a pair of feed rollers adapted to frictionally engage said superposed elements for advancing said elements within said camera apparatus, means located externally of said camera apparatus for actuating said advancing means, and storage means spaced from said advancing means and actuated thereby comprising a pair of releasably mounted take-up spools upon one of which said film element is adapted to be wound and upon the other of which such parts of said image-receptive element not previously detached are adapted to be wound, and means for supplying an interleaf material to the take-up spool upon which said film element is adapted to be wound.

11. The camera apparatus of claim 10 wherein said supply means comprises a releasably mounted free rotating spool for holding a quantity of interleaf material, said spool being predeterminedly spaced from said take-up spool upon which said film element is adapted to be wound.

References Cited in the file of this patent

UNITED STATES PATENTS

| Number | Name | Date |
| --- | --- | --- |
| 1,490,487 | Schmidt | Apr. 25, 1924 |
| 1,588,869 | Wolk | June 15, 1926 |
| 2,533,099 | Earhart | Dec. 5, 1950 |
| 2,543,160 | Fairbanks | Feb. 27, 1951 |
| 2,780,972 | Fairbanks | Feb. 12, 1957 |
| 3,009,404 | Eloranta | Nov. 21, 1961 |